US011468445B2

(12) United States Patent
Zhou et al.

(10) Patent No.: US 11,468,445 B2
(45) Date of Patent: *Oct. 11, 2022

(54) SERVICE PROCESSING METHOD, DEVICE, AND SYSTEM

(71) Applicant: Advanced New Technologies Co., Ltd., Grand Cayman (KY)

(72) Inventors: Le Zhou, Zhejiang (CN); Li Chen, Zhejiang (CN); Huanmi Yin, Zhejiang (CN); Hong Zhang, Zhejiang (CN); Sihai Yao, Zhejiang (CN); Xiaobo Zhang, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 122 days.

This patent is subject to a terminal disclaimer.

(21) Appl. No.: 17/214,278

(22) Filed: Mar. 26, 2021

(65) Prior Publication Data
US 2021/0217025 A1 Jul. 15, 2021

Related U.S. Application Data

(63) Continuation of application No. 16/727,002, filed on Dec. 26, 2019, now Pat. No. 10,984,421, which is a (Continued)

(30) Foreign Application Priority Data

Jun. 26, 2017 (CN) .......................... 201710495521.2

(51) Int. Cl.
G06Q 20/40 (2012.01)
G06Q 20/32 (2012.01)

(52) U.S. Cl.
CPC ..... G06Q 20/40145 (2013.01); G06Q 20/325 (2013.01)

(58) Field of Classification Search
CPC .................. G06Q 20/40145; G06Q 20/325
(Continued)

(56) References Cited

U.S. PATENT DOCUMENTS 7,680,702 B1  3/2010  Oakes, III
8,086,497 B1  12/2011  Oakes, III
(Continued)

FOREIGN PATENT DOCUMENTS

CN  102710549 A  10/2012
CN  102905348 A  1/2013
(Continued)

OTHER PUBLICATIONS

Braun et al., "Understanding Risk Management in Emerging retail payments", Economic Policy Review—Federal Reserve Bank of New York 14.2: 137-159, Federal Reserve Bank of New York, September (Year: 2008).*

(Continued)

Primary Examiner — Frantzy Poinvil
(74) Attorney, Agent, or Firm — Finnegan, Henderson, Farabow, Garrett & Dunner, LLP

(57) ABSTRACT

A service processing method includes: receiving RF signals sent by at least one terminal device, the RF signals including at least one device identifier of the at least one terminal device; selecting an RF signal from the received RF signals, and determining a terminal device corresponding to a device identifier included in the RF signal as a target payment device; collecting first biometric feature information of a user using the terminal device; and after obtaining a verification result of a verification on the user's identity based on the first biometric feature information, sending a payment request to a server if the verification is passed, wherein the
(Continued)

payment request is configured to request for completing payment based on a payment account corresponding to the target payment device.

18 Claims, 10 Drawing Sheets

Related U.S. Application Data continuation of application No. PCT/CN2018/092201, filed on Jun. 21, 2018.

(58) Field of Classification Search
USPC .......................................... 705/3–44
See application file for complete search history.

(56) References Cited

U.S. PATENT DOCUMENTS

| | | | |
|---|---|---|---|
| 8,423,475 B2 | 4/2013 | Bishop et al. | |
| 8,646,060 B1* | 2/2014 | Ben Ayed | H04W 4/20 |
| | | | 726/9 |
| 8,880,434 B2 | 11/2014 | Bemmel et al. | |
| 8,972,286 B2 | 3/2015 | Grigg et al. | |
| 9,032,498 B1* | 5/2015 | Ben Ayed | G06F 21/35 |
| | | | 726/9 |
| 9,485,266 B2* | 11/2016 | Baxley | G07C 9/22 |
| 10,878,439 B2* | 12/2020 | Kothe | G06Q 30/0225 |
| 2005/0171898 A1 | 8/2005 | Bishop et al. | |
| 2005/0187870 A1 | 8/2005 | Grear et al. | |
| 2009/0070272 A1* | 3/2009 | Jain | G06K 7/10237 |
| | | | 705/75 |
| 2011/0289001 A1* | 11/2011 | Bishop | G07C 9/29 |
| | | | 705/44 |
| 2012/0072350 A1* | 3/2012 | Goldthwaite | G06Q 20/02 |
| | | | 705/44 |
| 2012/0278193 A1* | 11/2012 | Groat | G06Q 20/40145 |
| | | | 705/26.1 |
| 2013/0282589 A1 | 10/2013 | Shoup et al. | |
| 2015/0134531 A1 | 5/2015 | Xia | |
| 2015/0356563 A1* | 12/2015 | Vohra | G06Q 20/3224 |
| | | | 705/44 |
| 2016/0012465 A1* | 1/2016 | Sharp | G06Q 20/321 |
| | | | 705/14.17 |
| 2016/0203522 A1 | 7/2016 | Shiffert et al. | |
| 2016/0244311 A1 | 8/2016 | Burks et al. | |
| 2016/0248479 A1* | 8/2016 | Bellenger | H04W 4/80 |
| 2016/0253669 A1* | 9/2016 | Yoon | G06Q 20/327 |
| | | | 705/75 |
| 2017/0076274 A1* | 3/2017 | Royyuru | G06Q 20/18 |
| 2019/0141021 A1* | 5/2019 | Isaacson | G06Q 50/01 |

FOREIGN PATENT DOCUMENTS

| | | | | |
|---|---|---|---|---|
| CN | 103455913 A | 12/2013 | | |
| CN | 104599121 A | 5/2015 | | |
| CN | 106022762 A | 10/2016 | | |
| CN | 106407843 A | 2/2017 | | |
| WO | WO-2016154009 A1 * | 9/2016 | ......... | G06Q 30/0207 |
| WO | WO 2017/091431 A1 | 6/2017 | | |

OTHER PUBLICATIONS

Examination Report of Indian Application No. 201937049303 dated Mar. 2, 2021.
International Search Report in International Application No. PCT/CN2018/092201, dated Sep. 19, 2018.
Written Opinion in Application No. 11201911378X, from Intellectual Property Office of Singapore, dated Apr. 1, 2020.
Extended European Search Report in European Application No. 1882457 4.0, dated Jun. 9, 2020.
Written Opinion of Application No. 11201911378X, from the Intellectual Property Office of Singapore, dated Apr. 1, 2020.
Office Communication of European Application No. 18824574.0 dated Apr. 12, 2021.
Examination Report of Singapore Application No. 11201911378X dated Mar. 18, 2022.

* cited by examiner

SERVICE PROCESSING METHOD, DEVICE, AND SYSTEM

CROSS-REFERENCE TO RELATED APPLICATION

The present application is a continuation application of U.S. application Ser. No. 16/727,002, filed on Dec. 26, 2019, now, U.S. Pat. No. 10,984,421 which is a continuation application of and claims priority to International Application No. PCT/CN2018/092201, filed on Jun. 21 2018, which is based upon and claims priority to Chinese Application No. 201710495521.2, filed on Jun. 26, 2017, all of which are incorporated herein by reference in their entireties.

TECHNICAL FIELD

The specification generally relates to the field of Internet information processing technologies and computer technologies, and in particular, to service processing methods, devices, and systems.

BACKGROUND

Most people are familiar with the traditional payment mode of cash payment for products or services. With the development of Internet technologies, a new payment mode, i.e., electronic payment mode, has emerged. The electronic payment mode can refer to the scenario where parties engaged in e-commerce transactions (including consumers, manufacturers, and financial institutions) implement fee payment or fund transfer by using a digitized mode and secure information transmission through information networks. Compared with the cash payment mode, it brings convenience to people.

For example, with the mobile payment mode, when a user purchases a commodity in a store, the user can start a payment application installed on a terminal device when paying for the commodity. The terminal device can acquire the merchant's information by scanning, and complete the payment through transfer of funds. Alternatively, the user can start the payment application installed on the terminal device to generate a payment code (such as a QR code) based on a pre-bound payment account, and provide the payment code to the merchant for completing the payment.

In view of the current electronic payment modes, there is a need for service processing methods that can improve the speed and convenience of electronic payment.

SUMMARY

Embodiments of the specification provides service processing methods, devices, and systems, for improving the speed and convenience of electronic payment.

According to some embodiments, a service processing method comprises: receiving RF signals sent by at least one terminal device, the RF signals including at least one device identifier of the at least one terminal device; selecting an RF signal from the received RF signals, and determining a terminal device corresponding to a device identifier included in the RF signal as a target payment device; collecting first biometric feature information of a user using the terminal device; and after obtaining a verification result of a verification on the user's identity based on the first biometric feature information, sending a payment request to a server if the verification is passed, wherein the payment request is configured to request for completing payment based on a payment account corresponding to the target payment device.

According to some embodiments, a service processing devices comprises: a processor, and a memory storing instructions executable by the processor, wherein the processor is configured to: receive RF signals sent by at least one terminal device, the RF signals including at least one device identifier of the at least one terminal device; select an RF signal from the received RF signals, and determine a terminal device corresponding to a device identifier included in the RF signal as a target payment device; collect first biometric feature information of a user using the terminal device; and after obtaining a verification result of a verification on the user's identity based on the first biometric feature information, send a payment request to a server if the verification is passed, wherein the payment request is configured to request for completing payment based on a payment account corresponding to the target payment device.

According to some embodiments, a service processing method comprises: transmitting an RF signal including a device identifier of a terminal device; and receiving payment information, the payment information being sent by a server after completing payment based on a payment account corresponding to the device identifier. The device identifier is carried in a payment request sent by a service processing device. The payment request is sent by the service processing device after receiving the RF signal and when obtaining a verification result indicating that a verification on user identity of a user using the terminal device is passed based on collected first biometric feature information of the user.

According to some embodiments, a terminal device comprises: a processor, and a memory storing instructions executable by the processor, wherein the processor is configured to: transmit an RF signal including a device identifier of the terminal device; and receive payment information, the payment information being sent by a server after completing payment based on a payment account corresponding to the device identifier. The device identifier is carried in a payment request sent by a service processing device. The payment request is sent by the service processing device after receiving the RF signal and when obtaining a verification result indicating that a verification on user identity of a user using the terminal device is passed based on collected first biometric feature information of the user.

According to some embodiments, a service processing method comprises: receiving a payment request sent by a service processing device, wherein the payment request includes a device identifier of a terminal device, and the device identifier is obtained by the service processing device selecting an RF signal from RF signals sent by at least one terminal device; determining a payment account corresponding to the device identifier included in the payment request according to a mapping relationship between the device identifier and the payment account; and completing payment by using the payment account.

According to some embodiments, a server comprises: a processor, and a memory storing instructions executable by the processor, wherein the processor is configured to: receive a payment request sent by a service processing device, wherein the payment request includes a device identifier of a terminal device, and the device identifier is obtained by the service processing device selecting an RF signal from RF signals sent by at least one terminal device; determine a payment account corresponding to the device identifier included in the payment request according to a mapping relationship between the device identifier and the payment account; and use the payment account to complete payment.

According to some embodiments, a service processing system comprises: a service processing device, a terminal device, and a server. The service processing device can be configured to receive RF signals including device identifiers and sent by at least one terminal device; select an RF signal from the received RF signals, and use a terminal device corresponding to a device identifier included in the RF signal as a target payment device; collect first biometric feature information of a user using the terminal device; and after obtaining a user identity verification result based on the first biometric feature information, send a payment request to a server if the verification result is passing the verification, wherein the payment request is configured to request for completing payment based on a payment account corresponding to the target payment device. The terminal device can be configured to transmit an RF signal, and receive payment information. The server can be configured to receive the payment request sent by the service processing device, and complete payment based on the payment account corresponding to the device identifier included in the payment request. The server can then send the payment information to the terminal device corresponding to the device identifier.

The technical solutions adopted in some embodiments of the specification can achieve the following beneficial effects. According to some embodiments, device identifiers sent by at least one terminal device can be received. An RF signal can be selected from the received RF signals, and a terminal device corresponding to a device identifier included in the RF signal can be used as a target payment device. First biometric feature information of a user using the terminal device can be collected. After obtaining a user identity verification result based on the first biometric feature information, a payment request can be sent to a server if the verification result is passing the verification. The payment request can be used to request for completing payment based on a payment account corresponding to the target payment device.

Accordingly, a payment device is selected through the RF signal sent by the terminal device. The biometric feature information of the user can be collected, and identity authentication can be performed on the user by using the collected biometric feature information. Payment can be completed when the authentication is passed, thereby ensuring both security of payment operations and convenience in processing the payment operations. The solutions provided herein can simplify the processing of the payment operations, implementing "hands-free payment" in the field of electronic payment. The solutions can therefore effectively improve user experience in electronic payment.

BRIEF DESCRIPTION OF THE DRAWINGS

The accompanying drawings described here are used to provide further understanding of the specification, and constitute a part of the specification. Embodiments of the specification and illustrations thereof are used to explain the specification. The examples provided herein are not intended to form any improper limitation on the scope of the specification.

DETAILED DESCRIPTION

Compared with cash payment, electronic payment (e.g., the above-mentioned barcode or QR code scanning payment) mode improves security and speed of the payment process. However, in practical applications, when a user uses a terminal device to complete payment, the current operation processes are relatively complicated, which causes some inconvenience to the user. For example, for a user who is holding a baby, the current payment methods such as scanning after purchasing commodities, would be inconvenient to the user.

Embodiments of the specification provide service processing methods, devices, and systems. For example, the solutions provided herein can select a payment device through a radio frequency (RF) signal sent by a terminal device, collect biometric feature information of a user, perform identity authentication on the user by using the biometric feature information, and complete payment after the authentication is passed. That way, security of payment operations and speed in processing the payment operations can be improved. The processes of the payment operations can be simplified. The solutions provided herein can implement hands-free payment in the field of electronic payment, and effectively improve user experience in electronic payment. Hands-free payment may be understood as an electronic payment mode that can process payment flexibly and quickly, without excessive payment operations by the users during the payment process.

Embodiments are described below in detail with reference to corresponding accompanying drawings. It is appreciated that the described embodiments are merely examples, rather than all embodiments of the specification.

Figure 1:
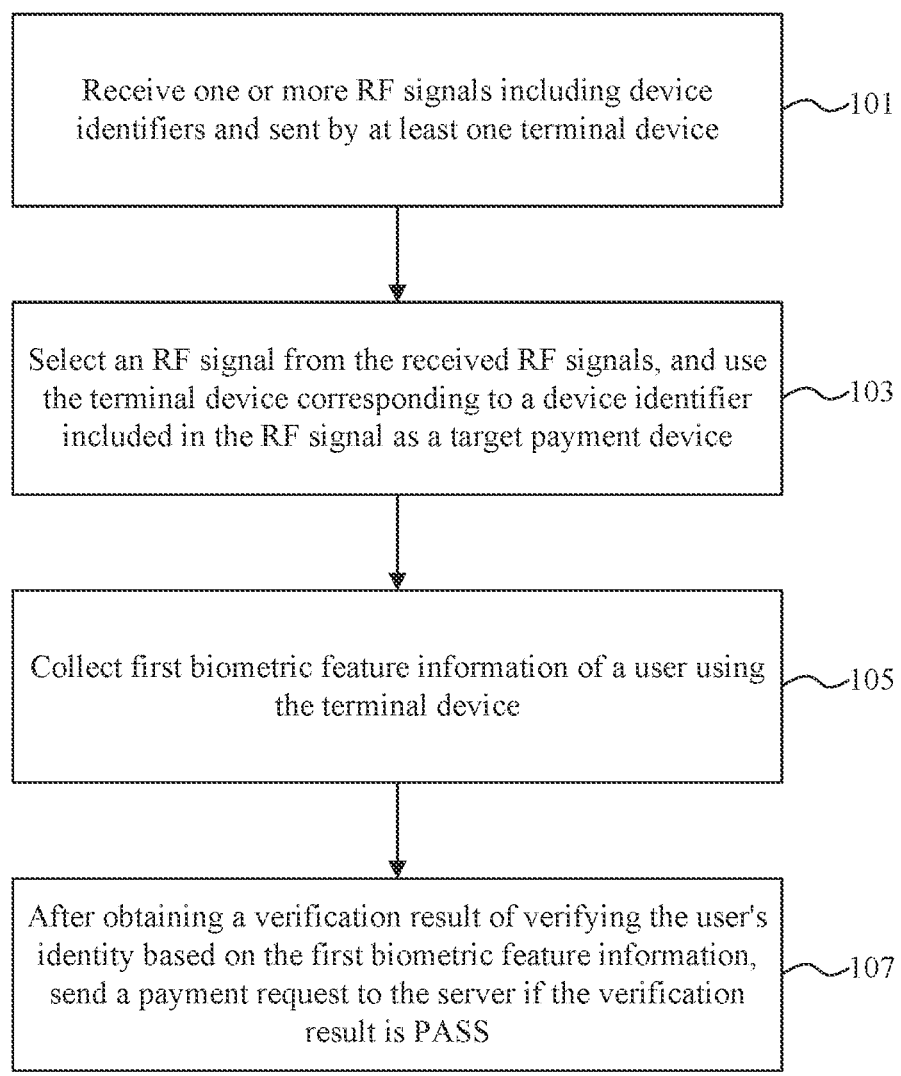
FIG. 1 is a flowchart of a service processing method, according to some embodiments of the specification.

FIG. 1 is a flowchart of a service processing method 100 according to some embodiments. The method 100 may be executed by, for example, a service processing device with a checkout function. As shown in FIG. 1, the method 100 can include the following steps.

In step 101, one or more RF signals including device identifiers and sent by at least one terminal device are received.

In some embodiments, after entering a target site, a user can start a short-range communication function of a terminal device. For example, the terminal device used by the user may send an RF signal in real time or periodically. Once the service processing device with a checkout function detects the RF signal, the user can be considered as a user waiting for payment.

The RF signals including device identifiers and sent by at least one terminal device can be received through a short-range communication mode. The short-range communication mode can include, for example, one or more of a Bluetooth communication mode, a near field communications (NFC) mode, a WIFI mode, and a sound wave mode.

In some embodiments, a payment region, which may also be referred to as a detection region, may be also determined. Once the user enters the detection region, and the short-range communication function of the terminal device is started, the service processing device with a checkout function can receive the RF signal sent by the terminal device. That is, when it is detected that the terminal device arrives at the detection region. RF signals including device identifiers and sent by the terminal device are received.

Figure 2:
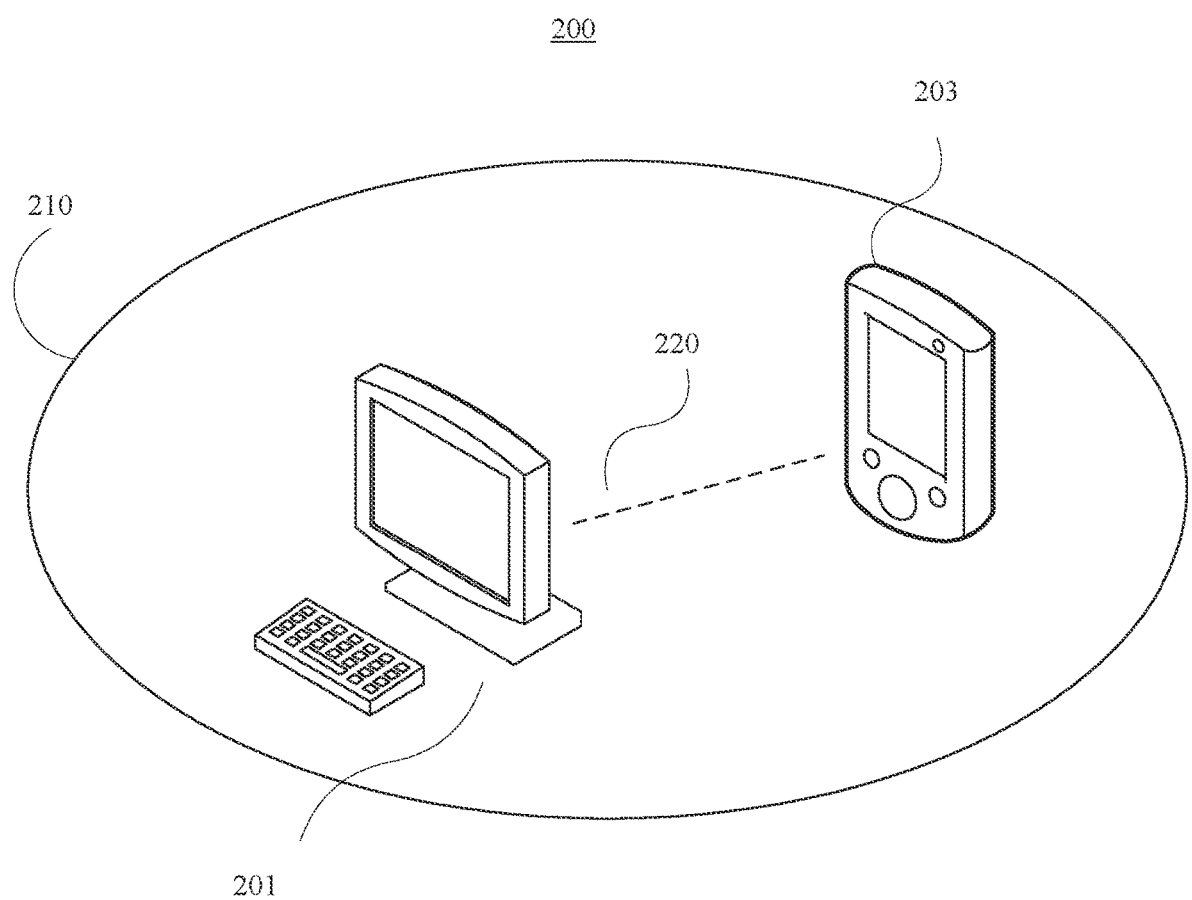
FIG. 2 is a schematic diagram illustrating the process of receiving an RF signal sent by a terminal device in a detection region, according to some embodiments of the specification.

FIG. 2 is a schematic diagram illustrating a process 200 of receiving an RF signal sent by a terminal device in a detection region according to some embodiments. As shown in FIG. 2, a service processing device 201 with checkout function can detect an RF signal 220 sent by a terminal device 203, once the user enters a detection region 210.

In some embodiments, the service processing device 201 with a checkout function can transmit a detection signal in the preset detection region 210. It can be determined that the arrival of the terminal device 203 at the detection region 210 is detected when a feedback signal sent by the terminal device 203 is received.

In some embodiments, a first detection device may also be deployed in the detection region. A first detection signal (including, for example, a device identifier of the first detection device) transmitted by the first detection device can cover the detection region. A second detection device can be deployed outside of the detection region. A second detection signal (including, for example, a device identifier of the second detection device) transmitted by the detection device can cover a region outside of the detection region. Then, when a feedback signal in response to the first detection signal sent by the terminal device is received, it can be determined that the terminal device arrives at the detection region. In some embodiments, the first detection signal and the second detection signal herein can be RF signals with transmitting directions opposite to each other.

In some embodiments of the specification, after a user enters a target site, an IoT monitoring device in the target site may detect the terminal device used by the user, thereby determining a device identifier of the terminal device used by the user.

Figure 3:
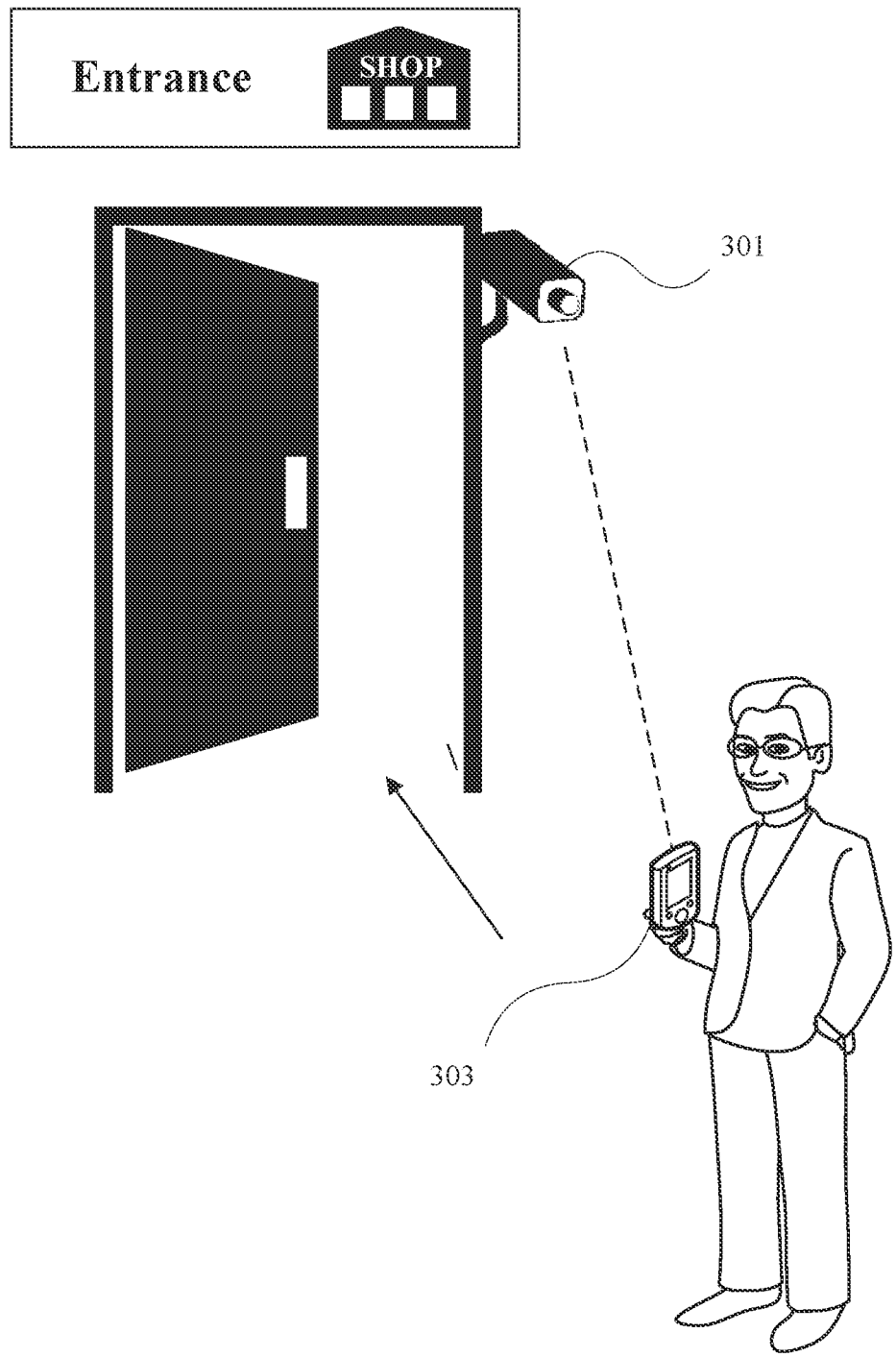
FIG. 3 is a schematic diagram illustrating the process of detecting, by an Internet of Things (IoT) monitoring device, a terminal device used by a user when the user enters a target site, according to some embodiments of the specification.

FIG. 3 is a schematic diagram of detecting, by an IoT monitoring device 301, a terminal device 303 used by a user when the user enters a target site, according to some embodiments.

The service processing device with a checkout function may receive first monitoring data sent by the IoT monitoring device 301. The first monitoring data can include a device identifier of the terminal device 303 used by the user entering the target site. The device identifier of the terminal device 303 can then be added to a user list. For example, the user list can include users who may need to perform payment. Thus, the service processing device with a checkout function may determine the number of the users in the target site according to the number of device identifiers in the user list.

Figure 4:
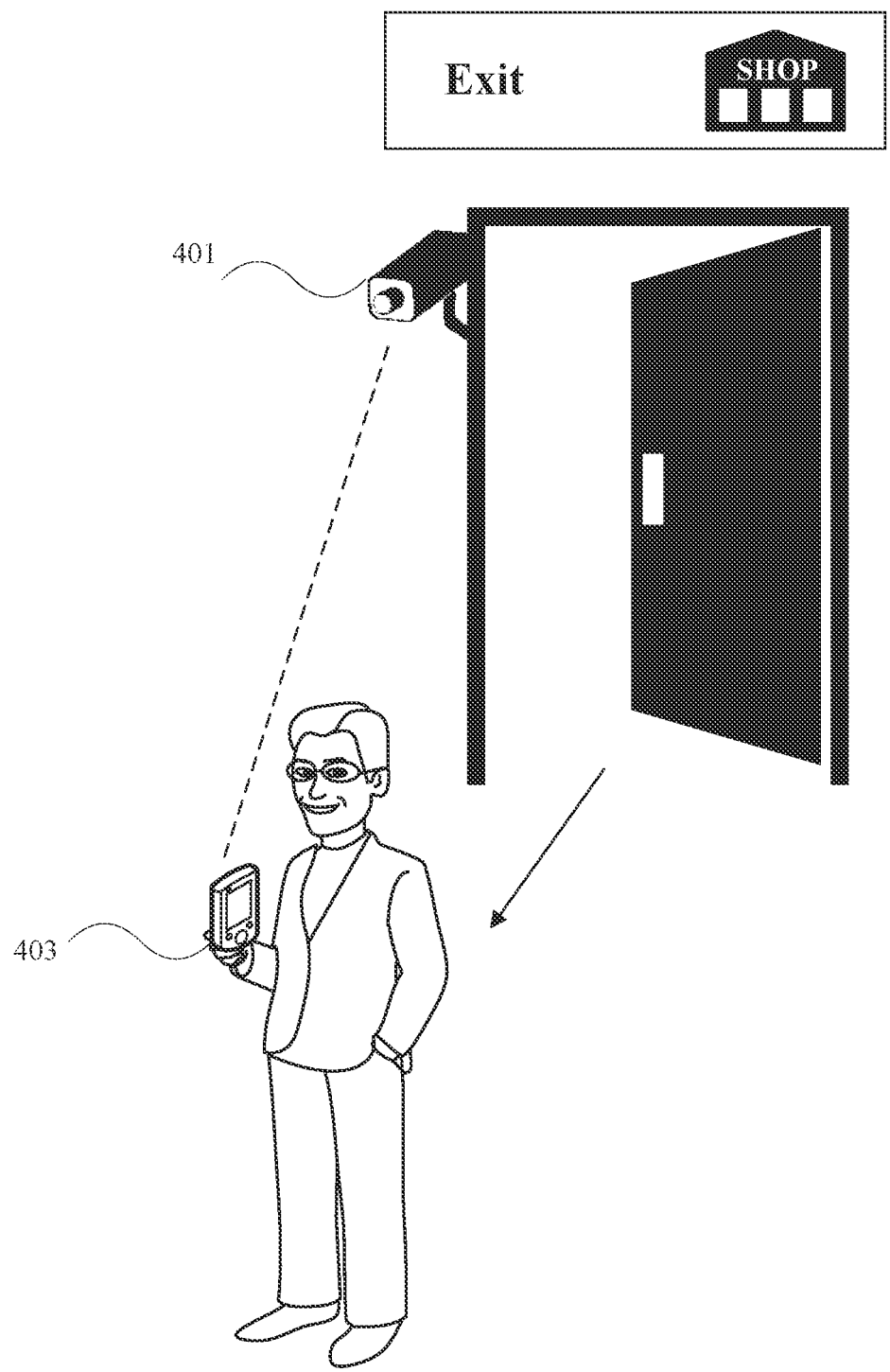
FIG. 4 is a schematic diagram illustrating the process of detecting, by an IoT monitoring device, a terminal device used by a user when the user departs from a target site, according to some embodiments of the specification.

Similarly, after the user departs from the target site, an IoT monitoring device for detecting user departure from the target site may detect the terminal device used by the user, thereby determining the device identifier of the terminal device used by the user who is departing from the target site. FIG. 4 is a schematic diagram of detecting, by an IoT monitoring device 401, a terminal device 403 used by a user when the user departs from a target site, according to some embodiments.

The service processing device with a checkout function may receive second monitoring data sent by the IoT monitoring device 401. The second monitoring data can include a device identifier of the terminal device 403 used by the user departing from the target site. The user list can be updated according to the second monitoring data. For example, the device identifier of the terminal device used by the departing user can be removed.

In some embodiments, after receiving RF signals, device identifiers of the terminal devices sending the RF signals can be determined. The determined device identifiers can be compared with the device identifiers included in the user list. RF signals corresponding to the device identifiers that are not included in the user list can be determined and filtered out.

Referring back to FIG. 1, in step 103, an RF signal can be selected from the received RF signals, and the terminal device corresponding to the device identifier included in the RF signal can be taken as a target payment device.

In some embodiments, if an RF signal is received, the terminal device corresponding to the device identifier included in the RF signal is taken as the target payment device. If multiple RF signals are received, an RF signal can be selected from the multiple RF signals, and the terminal device corresponding to the device identifier included in the selected RF signal is taken as the target payment device. Exemplary processes for selecting an RF signal from the received RF signals are described below.

In some embodiments, the signal strength of each of the received RF signals can be determined. The RF signal having a signal strength greater than a preset value is determined as the selected RF signal.

In some embodiments, a distance value corresponding to each of the received RF signals to a receiving device can be determined. For example, the distance value is determined based on the signal strength of a received signal. The distance value can indicate a distance between a terminal device and the receiving device. The RF signal having a distance value smaller than a preset threshold can be determined as the selected RF signal. The receiving device herein may be understood as the service processing device with a checkout function.

In some embodiments, user information corresponding to the device identifier included in each of the received RF signals can be acquired from a server, e.g., according to a preset masking algorithm, wherein the user information can be used to distinguish each of the RF signals. An RF signal can be selected from the received RF signals according to the user information.

The masking algorithm herein may facilitate acquiring and processing the user information corresponding to the device identifier included in each of the received RF signals. Differences among the user information corresponding to the device identifiers can be obtained, thereby distinguishing different RF signals based on the user information.

In some embodiments, these differences may be sent to an operator controlling the service processing device with a checkout function. The operator can determine a user waiting for payment according to the differences. The RF signal sent by the terminal device associated with the determined user can be used as the selected RF signal.

For example, a query message can be sent to the terminal device sending the RF signal according to the user information. The query message can be configured to confirm whether the user using the terminal device matches the user corresponding to the device identifier included in the RF signal. The RF signal sent by the terminal device can be determined as the selected RF signal after confirmation information sent by the terminal device is received.

In some embodiments, the user information acquired by using the masking algorithm can be a picture. The operator of the service processing device with a checkout function can determine through facial recognition that a user A waiting for payment is similar to the user recorded in the picture. The operator may send a query message to the terminal device used by the user A through the service processing device with a checkout function. After receiving the query message, the user A can send confirmation information to the service processing device with a checkout function to confirm that he/she is the user recorded in the picture. Based on the confirmation information, the service processing device with a checkout function can determine the RF signal sent by the terminal device used by the user A as the selected RF signal.

In some embodiments, the user information acquired by using the masking algorithm can be a question. The question can be presented by the operator of the service processing device with a checkout function to a user A waiting for payment. When the answer given by the user A is consistent with the answer sent by the server, the operator can determine that the RF signal sent by the terminal device used by the user A is the selected RF signal. The operator can send confirmation information to the service processing device with a checkout function, such that the service processing device with a checkout function determines the RF signal sent by the terminal device used by the user A as the selected RF signal.

In some embodiments, a time at which each of the RF signals is received can be determined. Each of the RF signals can be sorted according to the determined time. The RF signal having a sorting number smaller than a preset number can be determined as the selected RF signal according to the sorting result. For example, a smaller sorting number may indicate that the RF signal is received at an earlier time. For example, it is determined that first, second and third RF signals are received at times t1, t2, and t3, respectively. The three RF signals are then sorted according to the times t1, t2, and t3. In this example, t1 is earlier than t2 and t2 is earlier than t3. Accordingly, the first, second and third RF signals are assigned with sorting numbers 1, 2, and 3, respectively. In an embodiment, the preset number is 2 and, therefore, the first RF signal is determined as the selected signal. In an embodiment, the preset number is 3 and, therefore, any of the first and second RF signals can be determined as the selected signal.

After the RF signal is selected, the terminal device corresponding to the device identifier included in the RF signal may be taken as a target payment device, and a payment operation can be started.

In step 105, first biometric feature information of the user using the terminal device can be collected. In some embodiments, the first biometric feature information of the user using the terminal device can be collected through an image recognition device. For example, when it is determined that the user using the terminal device arrives at the detection region, the first biometric feature information of the user can be collected through the image recognition device.

The biometric feature information can include one or more of face feature information, fingerprint information, palmprint information, eye print information, and iris information. It is appreciated that various modes, such as beacon, infrared detection, thermal detection, and other modes may be adopted to determine whether the user using the terminal device arrives at the detection region.

In some embodiments, when acquiring the biometric feature information, a user with the smallest distance to the service processing device with a checkout function in the detection region can be selected first. The biometric feature information of the user can be collected to ensure that the user is the same as the user corresponding to the determined target payment device, thereby improving payment efficiency.

In step 107, after a user identity verification result based on the first biometric feature information is obtained, a payment request can be sent to the server if the verification result is passing the verification. The payment request can be configured to request payment based on a payment account corresponding to the target payment device.

In some embodiments of the specification, the obtaining the user identity verification result based on the first biometric feature information can be performed by, but is not limited to, the following manners.

In some embodiments, second biometric feature information of the user corresponding to the device identifier included in the selected RF signal can be acquired from the server. The server can store a mapping relationship between a device identifier and biometric feature information of the user corresponding to the device identifier. The first biometric feature information can be compared with the second biometric feature information. A user identity verification result can be obtained according to the comparison result. For example, when the user registers with the server or logs into an application client, biometric data including feature information of the user may be collected in advance. Thus, the server may store a mapping relationship between the device identifier and the biometric data of the user in advance.

If the first biometric feature information is consistent with the second biometric feature information, it can be determined that the verification of the user's identity is passed. If the first biometric feature information is not consistent with the second biometric feature information, it can be determined that the verification on the user's identity is not passed. It is appreciated that, the terms "first" and "second" in the "first biometric feature information" and the "second biometric feature information" do not refer to any particular type of feature information, but merely used for clarity of the description.

In some embodiments, the first biometric feature information and the device identifier included in the selected RF signal can be sent to the server. The server can verify the user's identity according to the first biometric feature information and the second biometric feature information of the user corresponding to the device identifier included in the selected RF signal. The server can store a mapping relationship between a device identifier and biometric feature information of the user corresponding to the device identifier. A verification result can be obtained.

In the service processing device or the server, when the first biometric feature information is compared with the second biometric feature information, biometric features of the same type can be selected for comparison. For example, iris information can be compared with iris information. That is, the first biometric feature information and the second biometric feature information may include information about more than one biometric feature, and in that case, biometric features of the same type can be selected for comparison.

In some embodiments, when the verification is passed, it indicates that the user corresponding to the target payment device is the same as the user waiting for payment. At this time, order data of the user can be determined, and payment can be completed by using the payment account corresponding to the device identifier of the target payment device.

In some embodiments, the manner of determining the order data of the user may be, for example, determining the order data of the user manually by the operator controlling the service processing device with a checkout function. Alternatively and/or additionally, an IoT monitoring device can monitor the commodity object(s) selected by the user. The IoT monitoring device can then generate and send the order data to the service processing device with a checkout function. In some embodiments, the order data can be generated by the user through scanning an RFID tag associated with the commodity object(s) using the terminal device. In some embodiments, the order data may further be generated by scanning the purchased commodity object(s) through a scanning function, the specific manner of which is not limited herein.

In some embodiments, when the verification is passed, if the RF signal includes the order data, a payment amount can be determined according to the order data. The payment amount can be carried in the payment request to be sent to the server, such that the server deducts the payment amount from the payment account according to the payment amount to complete the payment.

The technical solution according to some embodiments can include: receiving one or more RF signals including device identifiers sent by at least one terminal device; selecting an RF signal from the received RF signals, and using a terminal device corresponding to a device identifier included in the RF signal as a target payment device; collecting first biometric feature information of a user using the terminal device; and after obtaining a user identity verification result based on the first biometric feature information, sending a payment request to a server if the verification result is passing the verification. The payment request can be used to request for completing payment based on a payment account corresponding to the target payment device. A payment device can be selected through the RF signal sent by the terminal device. The biometric feature information of the user can be collected, so that identity authentication can be performed on the user by using the biometric feature information. Payment can be completed when the authentication is passed, thereby ensuring both security and convenience of the payment processing operations. Further, the processes of the payment operations can be simplified. With the technical solutions provided herein, hands-free electronic payment can be achieved, which effectively improves user experience in electronic payment.

Figure 5:
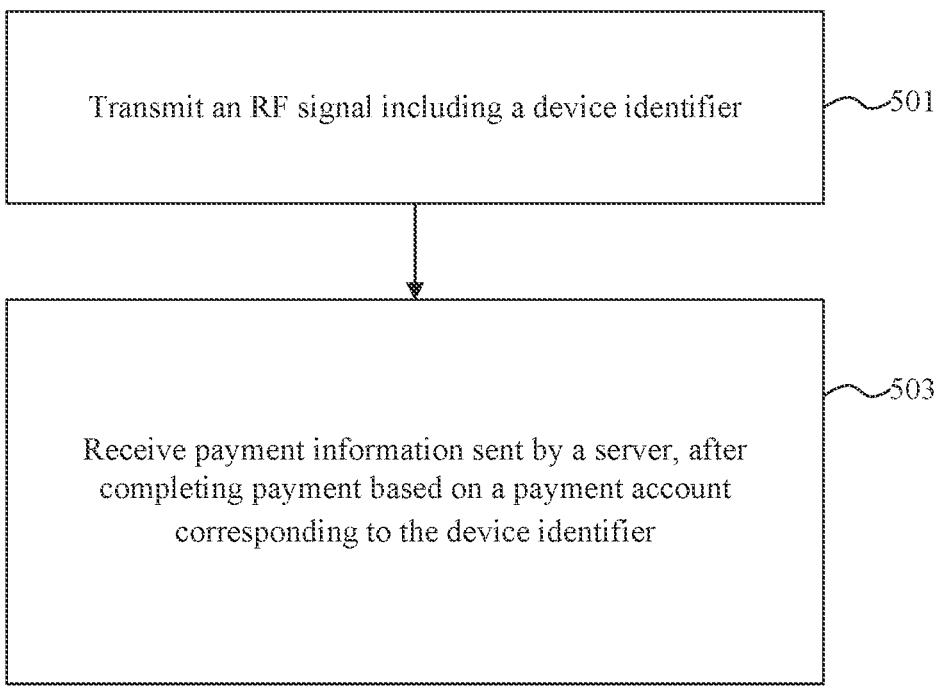
FIG. 5 is a flowchart of a service processing method, according to some embodiments of the specification.

FIG. 5 is a flowchart of a service processing method 500 according to some embodiments. The method 500 may be executed by an application client having a hands-free payment function, and the application client can be installed in a terminal device. As shown in FIG. 5, the method 500 can include the following steps.

In step 501, an RF signal including a device identifier is transmitted. In some embodiments, when it is detected that a short-range communication function is enabled, the RF signal can be transmitted periodically or in real time.

In step 503, payment information is received, wherein the payment information is sent by a server after completing payment based on a payment account corresponding to the device identifier. The device identifier can be carried in a payment request sent by a service processing device. The payment request can be sent by the service processing device after receiving the RF signal and when a verification result of verifying a user's identity based on collected first biometric feature information of the user is passing the verification.

In some embodiments, before the receiving payment information, the method 500 can further include: receiving a query message sent by the service processing device, wherein the query message is configured to confirm whether the user using the terminal device is consistent with the user corresponding to the device identifier included in the RF signal; and sending confirmation information to the service processing device when it is confirmed that the user using the terminal device is consistent with the user corresponding to the device identifier included in the RF signal.

In some embodiments, before the transmitting payment information, the method 500 can further include: scanning a commodity object selected by the user to generate order data. The transmitting the RF signal can include: transmitting the RF signal carrying the order data and the device identifier.

Figure 6:
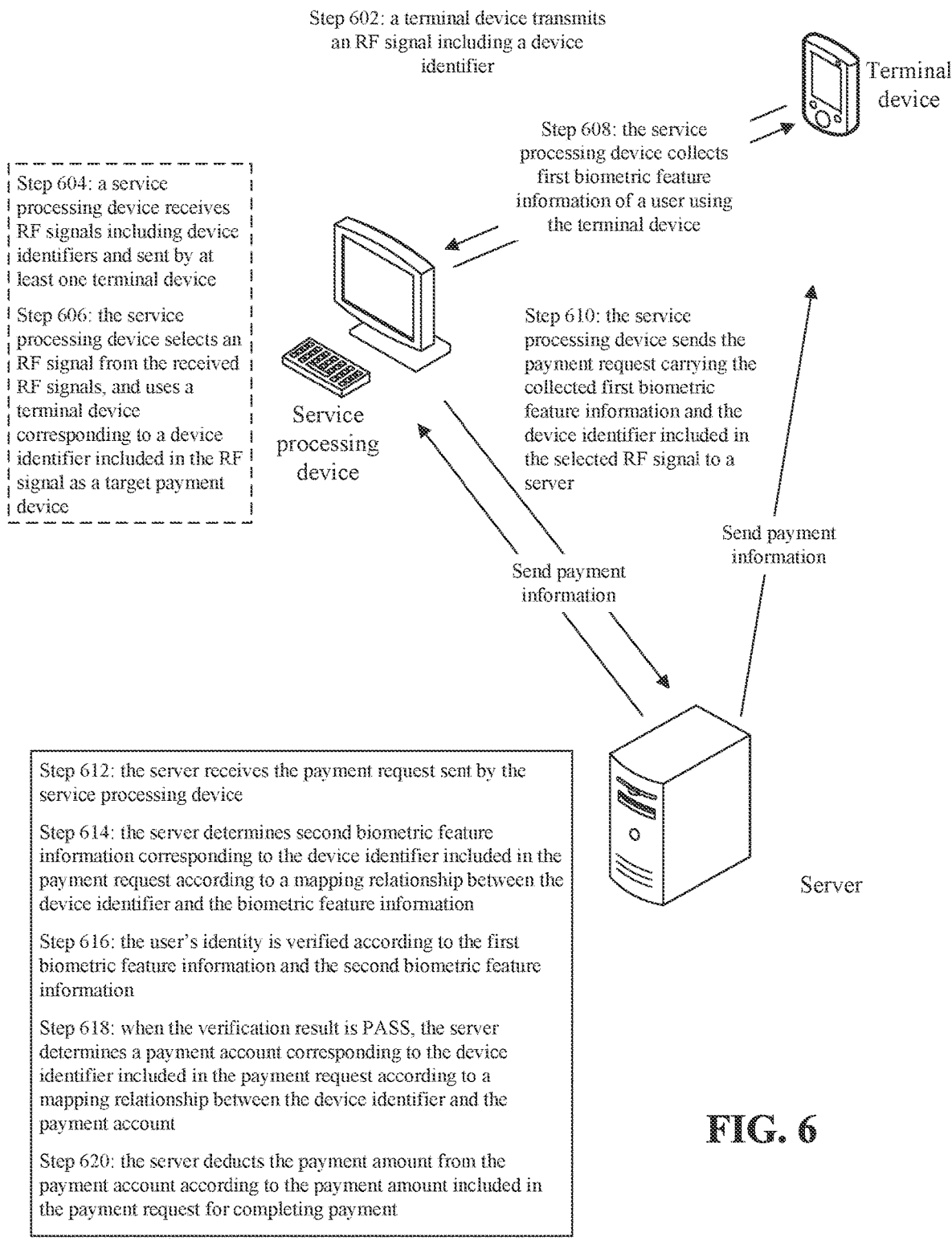
FIG. 6 is a flowchart of a service processing method, according to some embodiments of the specification.

FIG. 6 is a flowchart of a service processing method 600 according to some embodiments. The method 600 may include the following steps.

In step 602, a terminal device transmits an RF signal including a device identifier. In some embodiments, the terminal device may also send a payment request including the device identifier to a server.

In step 604, a service processing device receives RF signals including device identifiers sent by at least one terminal device.

In step 606, the service processing device selects an RF signal from the received RF signals, and takes a terminal device corresponding to a device identifier included in the RF signal as a target payment device.

In step 608, the service processing device collects first biometric feature information of a user using the terminal device.

In step 610, the service processing device sends the payment request carrying the collected first biometric feature information and the device identifier included in the selected RF signal to the server.

In step 612, the server receives the payment request sent by the service processing device.

In step 614, the server determines second biometric feature information corresponding to the device identifier included in the payment request according to a mapping relationship between the device identifier and the biometric feature information.

In step 616, the user's identity is verified according to the first biometric feature information and the second biometric feature information.

In step 618, when the verification result is passing the verification, the server determines a payment account corresponding to the device identifier included in the payment request according to a mapping relationship between the device identifier and the payment account.

In step 620, the server deducts the payment amount from the payment account according to the payment amount included in the payment request for completing the payment.

Figure 7:
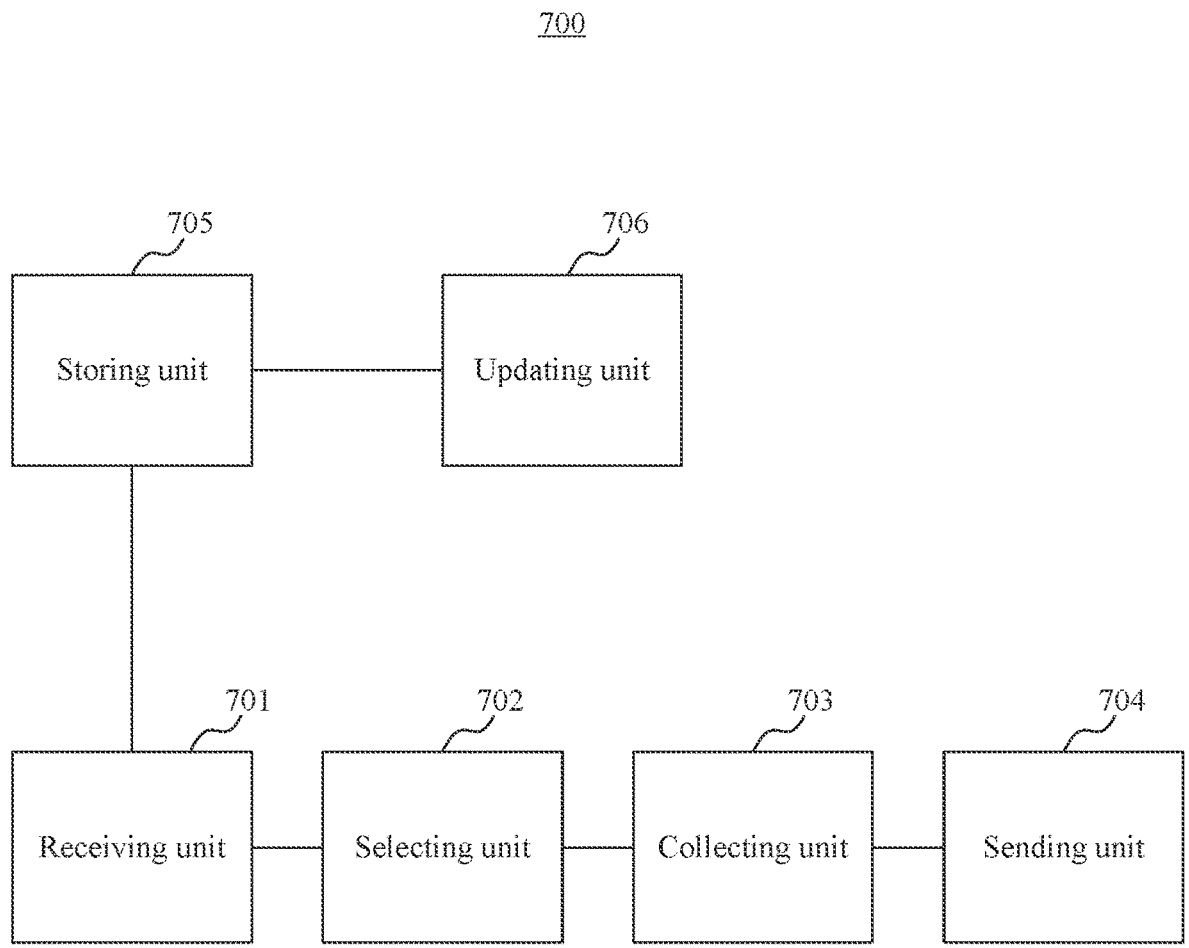
FIG. 7 is a schematic diagram of a service processing device, according to some embodiments of the specification.

FIG. 7 is a schematic diagram of a service processing device 700 according to some embodiments. The service processing device 700 can include: a receiving unit 701, a selecting unit 702, a collecting unit 703, and a sending unit 704. As shown in FIG. 7, in some embodiments, the service processing device 700 can further include a storing unit 705, and an updating unit 706.

The receiving unit 701 can be configured to receive RF signals including device identifiers and sent by at least one terminal device.

The selecting unit 702 can be configured to select an RF signal from the received RF signals, and use a terminal device corresponding to a device identifier included in the RF signal as a target payment device.

The collecting unit 703 can be configured to collect first biometric feature information of a user using the terminal device.

The sending unit 704 can be configured to, after obtaining a user identity verification result based on the first biometric feature information, send a payment request to a server if the verification result is passing the verification. The payment request can be configured to request for completing payment based on a payment account corresponding to the target payment device.

In some embodiments, the selecting, by the selecting unit 702, an RF signal from the received RF signals can further include the following procedures: determining a signal strength of each of the received RF signals; and determining the RF signal having the signal strength greater than a preset value as the selected RF signal.

In some embodiments, the selecting, by the selecting unit 702, an RF signal from the received RF signals can include: determining a distance value indicating a distance from a terminal device sending each of the RF signals to the receiving unit 701; and determining the RF signal with the distance value smaller than a preset threshold as the selected RF signal.

In some embodiments, the selecting, by the selecting unit 702, an RF signal from the received RF signals can include: acquiring, from a server, user information corresponding to the device identifier included in each of the received RF signals according to a preset masking algorithm, wherein the user information is configured to distinguish each of the RF signals; and selecting an RF signal from the received RF signals according to the user information.

In some embodiments, the selecting, by the selecting unit 702, an RF signal from the received RF signals according to the user information can include: sending a query message to the terminal device sending the RF signal according to the user information, wherein the query message is configured to confirm whether the user using the terminal device matches the user corresponding to the device identifier included in the RF signal; and determining the RF signal sent by the terminal device as the selected RF signal after receiving confirmation information sent by the terminal device.

In some embodiments, the selecting, by the selecting unit 702, an RF signal from the received RF signals can include: determining a time at which each of the RF signals is received; sorting each of the RF signals according to the determined time; and determining the RF signal having a sorting number smaller than a preset number as the selected RF signal according to the sorting result.

In some embodiments, the receiving, by the receiving unit 701, RF signals including device identifiers and sent by at least one terminal device can include: receiving the RF signals including the device identifiers and sent by the at least one terminal device through a short-range communication mode. In some embodiments, the short-range communication mode can include: one or more of a Bluetooth communication mode, a near field communications (NFC) mode, a wireless fidelity (WIFI) mode, and a sound wave mode.

In some embodiments, the receiving, by the receiving unit 701, RF signals including device identifiers and sent by at least one terminal device can include: receiving the RF signals including the device identifiers and sent by the terminal device when it is detected that the terminal device arrives at a detection region.

In some embodiments, the detecting, by the receiving unit 701 that the terminal device arrives at a detection region can include: transmitting a detection signal in a preset detection region; and determining that the arrival of the terminal device at the detection region is detected, when a feedback signal sent by the terminal device is detected.

In some embodiments, the collecting, by the collecting unit 703, first biometric feature information of a user using the terminal device can include: collecting the first biometric feature information of the user using the terminal device through an image recognition device.

In some embodiments, the collecting, by the collecting unit 703, the first biometric feature information of the user using the terminal device through an image recognition device can include: collecting the first biometric feature information of the user through the image recognition device when it is determined that the user using the terminal device arrives at the detection region.

In some embodiments, the biometric feature information can include one or more of: face feature information, fingerprint information, palmprint information, eye print information, and iris information.

In some embodiments, the acquiring, by the sending unit 704, a user identity verification result based on the first biometric feature information can include: acquiring, from a server, second biometric feature information of the user corresponding to the device identifier included in the selected RF signal, wherein the server stores a mapping relationship between a device identifier and biometric feature information of the user corresponding to the device identifier; comparing the first biometric feature information with the second biometric feature information; and obtaining a user identity verification result according to the comparison result.

In some embodiments, the obtaining, by the sending device 704, a user identity verification result according to the comparison result can further include: if the first biometric feature information is consistent with the second biometric feature information, determining that the verification on the user's identity is passed; and if the first biometric feature information is not consistent with the second biometric feature information, determining that the verification on the user's identity is not passed.

In some embodiments, the acquiring, by the sending unit 704, a user identity verification result based on the first biometric feature information can include: sending the first biometric feature information and the device identifier included in the selected RF signal to a server, so that the server verifies the user's identity according to the first biometric feature information and the second biometric feature information of the user corresponding to the device identifier included in the selected RF signal, wherein the server stores the mapping relationship between a device identifier and biometric feature information of the user corresponding to the device identifier; and receiving the verification result sent by the server.

In some embodiments, sending by the sending device 704, a payment request to a server can include: when the verification is passed, if the RF signal includes order data, determining a payment amount according to the order data; and sending the payment request carrying the payment amount to the server.

In some embodiments, the service processing device 700 further include a storing unit 705. The receiving unit 701 can be further configured to receive first monitoring data sent by an IoT monitoring device, wherein the first monitoring data includes a device identifier of a terminal device used by a user entering a target site. The storing unit 705 can be configured to store the device identifier into a user list.

In some embodiments, the service processing device 700 can further include an updating unit 706. The receiving unit 701 can be configured to receive second monitoring data sent by an IoT monitoring device, wherein the second monitoring data includes a device identifier of a terminal device used by a user departing from the target site. The updating unit 706 can be configured to update the user list according to the second monitoring data.

It should be appreciated that, the service processing device 700 may be implemented by means of software or hardware or a combination of software and hardware, which is not limited herein. The service processing device 700 can select the payment device through the RF signal sent by the terminal device, then collect the biometric feature information of the user, perform identity authentication on the user by using the biometric feature information, and complete payment when the authentication is passed. Both security of payment operations and convenience in processing the payment operations can be improved, thereby simplifying processes of the payment operations. With the solutions provided herein, hands-free payment in the field of electronic payment can be implemented, which can effectively improve the user experience in electronic payment.

In some embodiments, a service processing device can include: at least one processor; and a memory storing programs causing the at least one processor to perform the following procedures: receiving RF signals including device identifiers and sent by at least one terminal device; selecting an RF signal from the received RF signals, and using a terminal device corresponding to a device identifier included in the RF signal as a target payment device; collecting first biometric feature information of a user using the terminal device; and after obtaining a user identity verification result based on the first biometric feature information, sending a payment request to a server if the verification result is passing the verification. The payment request can be used to request for completing payment based on a payment account corresponding to the target payment device. For details of the procedures, reference can be made to the corresponding processes described above with respect to the method and device embodiments.

Figure 8:
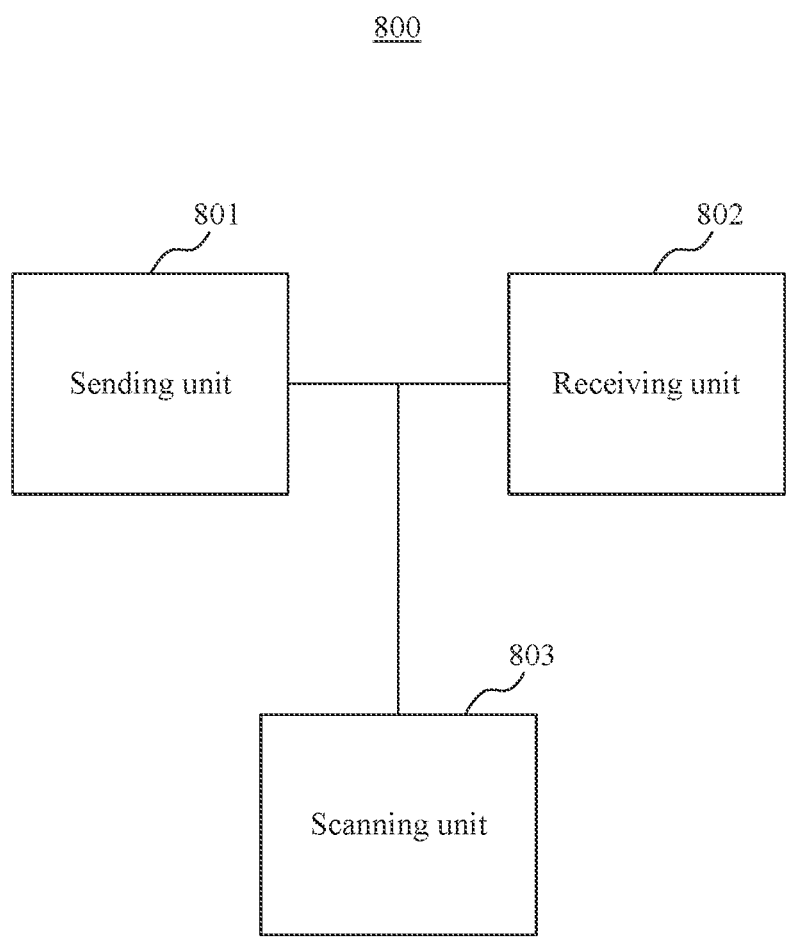
FIG. 8 is a schematic diagram of a terminal device, according to some embodiments of the specification.

FIG. 8 is a schematic diagram of a terminal device 800 according to some embodiments. As shown in FIG. 8, the terminal device 800 can include a sending unit 801 and a receiving unit 802. In some embodiments, the terminal device 800 can further include a scanning unit 803.

The sending unit 801 can be configured to transmit an RF signal including a device identifier.

The receiving unit 802 can be configured to receive payment information, wherein the payment information is sent by a server after completing payment based on a payment account corresponding to the device identifier. The device identifier can be carried in a payment request sent by a service processing device. The payment request can be sent by the service processing device after receiving the RF signal and when a verification result of verifying a user's identity based on collected first biometric feature information of the user is passing the verification.

In some embodiments, the transmitting the RF signal by the sending unit 801 can include: transmitting the RF signal periodically or in real time when it is detected that a short-range communication function is enabled.

In some embodiments, the receiving unit 802 can be configured to, before receiving payment information, receive a query message sent by the service processing device. The query message can be configured to confirm whether the user using the terminal device is consistent with the user corresponding to the device identifier included in the RF signal. The sending unit 801 can be configured to send confirmation information to the service processing device when it is confirmed that the user using the terminal device is consistent with the user corresponding to the device identifier included in the RF signal are consistent.

In some embodiments, the terminal device 800 can further include a scanning unit 803. The scanning unit 803 can be configured to, before transmitting the RF signal, scan a commodity object selected by the user to generate order data. The transmitting the RF signal by the sending unit 801 can include: transmitting the RF signal carrying the order data and the device identifier.

It should be appreciated that, the terminal device 800 may be implemented by means of software or hardware or a combination of software and hardware, which is not limited herein.

In some embodiments, a terminal device include: at least one processor; and a memory storing programs causing the at least one processor to perform the following procedures: transmitting an RF signal including a device identifier; and receiving payment information sent by a server after completing payment based on a payment account corresponding to the device identifier. The device identifier can be carried in a payment request sent by a service processing device. The payment request can be sent by the service processing device after receiving the RF signal and when a verification result of verifying a user's identity based on collected first biometric feature information of the user is passing the verification. For details of these procedures, reference can be made to corresponding processes described above with respect to the method and device embodiments.

Figure 9:
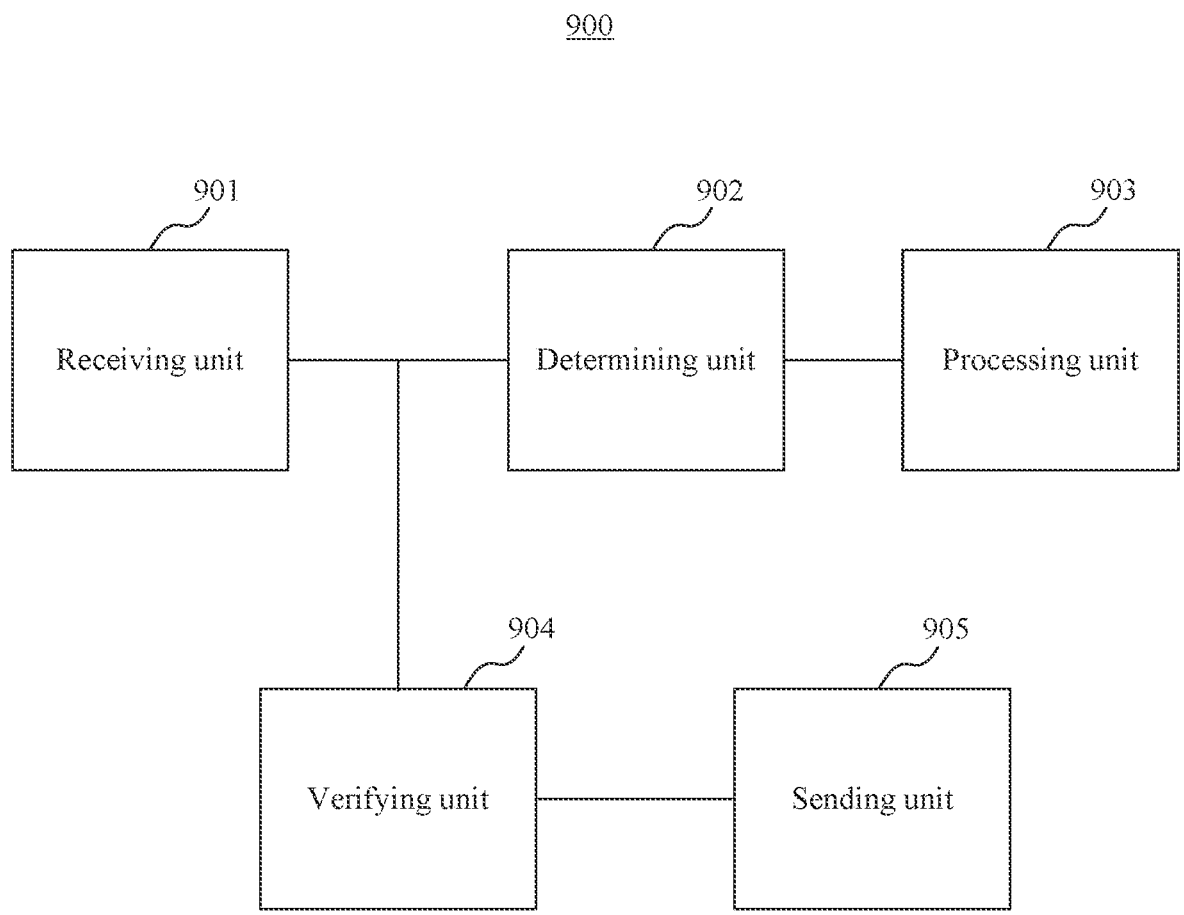
FIG. 9 is a schematic diagram of a service processing apparatus, according to some embodiments of the specification.

FIG. 9 is a schematic diagram of a service processing apparatus 900 according to some embodiments. The service processing apparatus 900 can be, for example, a server, or an apparatus located in a server. The service processing apparatus 900 can include a receiving unit 901, a determining unit 902, and a processing unit 903. In some embodiments, the service processing apparatus 900 can further include a verifying unit 904, and a sending unit 905.

The receiving unit 901 can be configured to receive a payment request sent by a service processing device. The payment request can include a device identifier of a terminal device, and the device identifier can be obtained by selecting based on the received RF signals sent by at least one terminal device.

The determining unit 902 can be configured to determine a payment account corresponding to the device identifier included in the payment request according to a mapping relationship between the device identifier and the payment account.

The processing unit 903 can be configured to complete payment by using the payment account.

In some embodiments, the service processing apparatus 900 can further include a verification unit 904. The verification unit 904 can be configured to: before determining a payment account corresponding to the device identifier included in the payment request, if the payment request includes first biometric feature information of a user, determine second biometric feature information corresponding to the device identifier included in the payment request, according to the mapping relationship between the device identifier and the biometric feature information; and verify the user's identity according to the first biometric feature information and the second biometric feature information.

In some embodiments, the service processing apparatus 900 can further include a sending unit 905. The sending unit 905 can be configured to send a verification result.

In some embodiments, determining, by the determining unit 902, a payment account corresponding to the device identifier included in the payment request can include: if the verification result is passing the verification, determining the payment account corresponding to the device identifier included in the payment request.

In some embodiments, completing, by the processing unit 903, payment by using the payment account can include: deducting the payment amount from the payment account according to the payment amount included in the payment request for completing the payment.

It should be appreciated that, the service processing apparatuses 900 may be implemented by means of software or hardware or a combination of software and hardware, which is not limited herein.

In some embodiments, a service processing apparatus comprises: at least one processor; and a memory storing programs causing the at least one processor to perform the following procedures: receiving a payment request sent by a service processing device, wherein the payment request includes a device identifier of a terminal device, and the device identifier is obtained by selecting based on received RF signals sent by at least one terminal device; and determining a payment account corresponding to the device identifier included in the payment request according to a mapping relationship between the device identifier and the payment account; and completing payment by using the payment account. For details of these procedures, reference can be made to corresponding processes described above with respect to the method and device embodiments.

Figure 10:
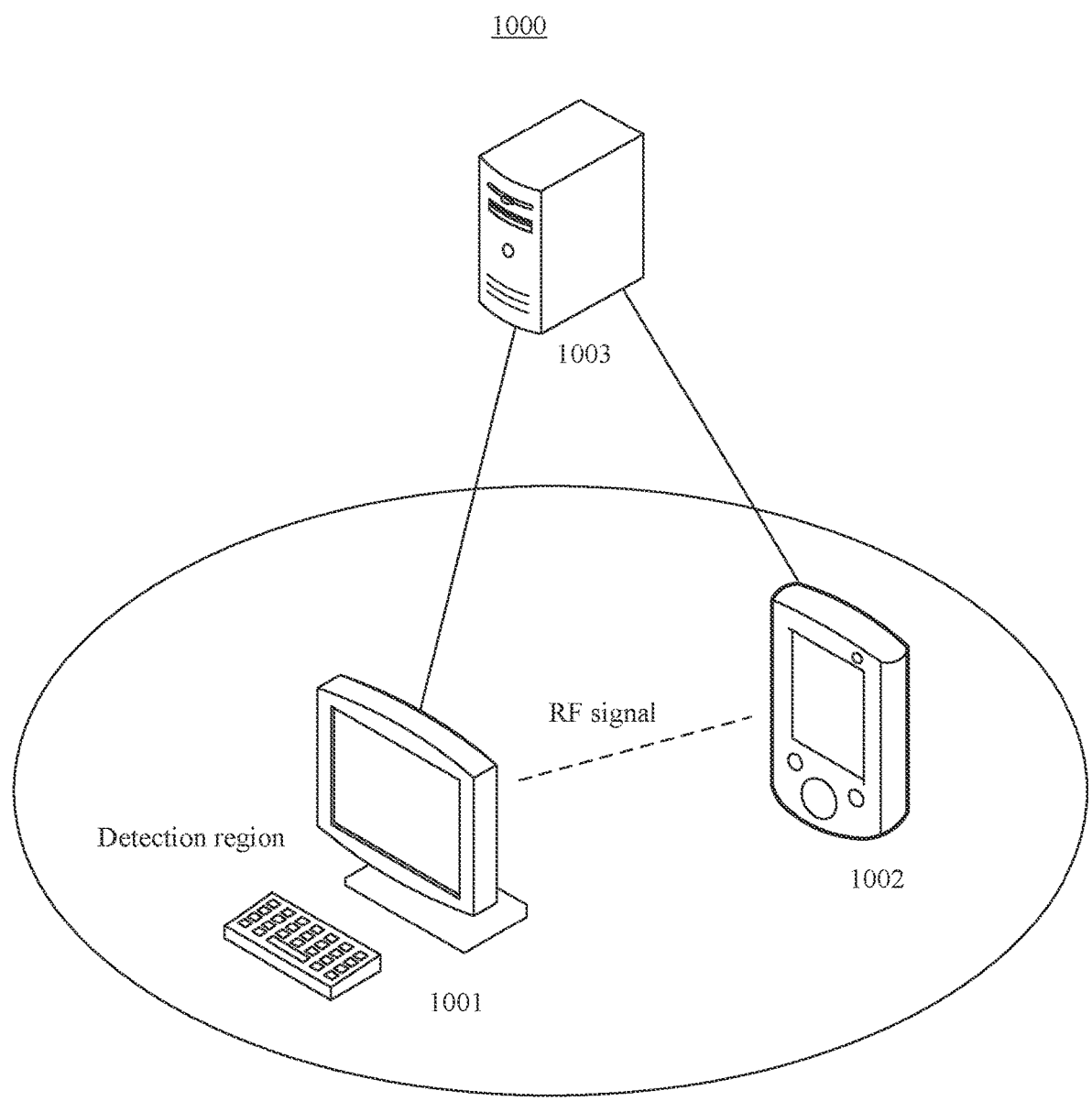
FIG. 10 is a schematic diagram of a service processing system, according to some embodiments of the specification.

FIG. 10 is a schematic diagram of a service processing system 1000 according to some embodiments. The system 1000 includes: a service processing device 1001, a terminal device 1002, and a server 1003.

The service processing device 1001 can be configured to receive RF signals including device identifiers sent by at least one terminal device; select an RF signal from the received RF signals, and use a terminal device corresponding to the device identifier included in the RF signal as a target payment device; collect first biometric feature information of a user using the terminal device; and after obtaining a user identity verification result based on the first biometric feature information, send a payment request to a server if the verification result is passing the verification. The payment request can be configured to request for completing payment based on a payment account corresponding to the target payment device.

The terminal device 1002 can be configured to transmit an RF signal; and receive payment information.

The server 1003 can be configured to receive the payment request sent by the service processing device, and complete payment based on the payment account corresponding to the device identifier included in the payment request, thereby sending the payment information to the terminal device corresponding to the device identifier.

For details of these procedures, reference can be made to corresponding processes described above with respect to the method and device embodiments.

Each of the above described methods and units may be implemented as software, or hardware, or a combination of software and hardware. For example, a Programmable Logic Device (PLD) (such as a Field Programmable Gate Array (FPGA)) is an integrated circuit, the logic functions of which can be programed by a user. Designers can "integrate" a digital system on a single PLD through programing, without requiring a chip manufacturer to design and fabricate a dedicated integrated circuit chip. Moreover, instead of manually making integrated circuit chips, programming can be implemented using logic compiler software, which is similar to a software compiler used in programming development. The original codes before compiling can be written in a programming language, which can be referred to as Hardware Description Language (HDL). There may be different types of HDL, such as ABEL (Advanced Boolean Expression Language). AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc. For example, commonly used HDLs include VHDL (Very-High-Speed Integrated Circuit Hardware Description Language) and Verilog. It is appreciated that method procedures described above can be programmed into an integrated circuit through logic programming using the above HDLs. A hardware circuit that implements the logic method procedures can be obtained.

The processing component (e.g., the processor) in the above described devices can be implemented in any suitable manner. For example, the processing component can be in a form of, for example, a microprocessor or processor and a computer readable medium, for storing computer readable program codes (e.g., software or firmware) executable by the (micro)processor, a logic gate, a switch, an Application Specific Integrated Circuit (ASIC), a programmable logic controller, and an embedded microcontroller. Examples of controllers include, but are not limited to, the following micro-controls: ARC 625D. Atmel AT91SAM, Microchip PIC18F26K20 and Silicone Labs C8051F320. The memory component can also be implemented as a part of the control logic of the memory. Those skilled in the art will also appreciate that in addition to implementing the processing component in purely computer readable program codes, the processing component can implement the same functions in a form of a logic gate, a switch, an ASIC, a programmable logic controller, and an embedded microcontroller by logically programming the method procedures. Thus, such a processing component can be considered as a hardware component, and the means for implementing various functions included therein can also be considered as a structure within the hardware component. Alternatively, the means for implementing various functions can be considered as either a software module that implements a method or a structure within a hardware component.

The system, the device, the module or the unit set forth in the above embodiments may be implemented by a computer chip or an entity, or by a product having a certain function. For example, the implementation device can be a computer. The computer can be in the form of, for example, a personal computer, a laptop computer, a cellular phone, a camera phone, a smart phone, a personal digital assistant, a media player, a navigation device, an email device, a game console, a tablet, a wearable device, or a combination of any of these devices.

For the convenience of description, the above devices are described in various units divided by functions. The units may be divided in a different manner. The functions of the various units may also be implemented in one or more pieces of software and/or hardware in the implementation of embodiments of the specification.

Those skilled in the art will appreciate that embodiments of the specification can be provided as a method, a system, or a computer program product. Thus, the specification can take the form of an entirely hardware embodiment, an entirely software embodiment, or an embodiment combining software and hardware. Moreover, the specification can take a form of a computer program product embodied by one or more computer usable storage media (including but not limited to a disk storage, a CD-ROM, an optical storage, etc.) in which computer usable program codes are included.

Some embodiments of the specification are described with reference to flowcharts and/or block diagrams. It will be understood that each step and/or block of the flowcharts and/or block diagrams, and combinations of the procedures and/or blocks in the flowcharts and/or block diagrams may be implemented in the form of computer program instructions. Such computer program instructions can be provided to a processor of a general purpose computer, a special purpose computer, an embedded processor, or other programmable data processing device to produce a machine. The functions associated with one or more procedures described with reference to the flowcharts and/or one or more blocks in the block diagrams can be implemented by a processor of the computer or other programmable data processing device executing the instructions.

The computer program instructions can also be stored in a computer readable memory which can guide a computer or other programmable data processing device to operate in a particular manner, causing instructions stored in the computer readable memory to produce an article of manufacture of an instruction device. The instruction device can implement functions associated with one or more procedures described above with reference to the flowcharts and/or one or more blocks in the block diagrams.

These computer program instructions can also be loaded onto a computer or other programmable data processing devices so that a series of operational procedures can be executed on the computer or other programmable data processing devices. For example, the instructions executed on the computer or other programmable data processing device provide procedures implementing functions described in one or more procedures in the flowcharts and/or one or more blocks in the block diagrams.

As an example, a computing device that can be used to implement the above-described methods can include one or more processors (CPUs), an input/output interface, a network interface, and a memory. The memory may include a non-permanent memory in a computer readable medium, a random access memory (RAM) and/or a non-volatile memory, such as a read only memory (ROM) or a flash memory (flash RAM). The memory is an example of a computer readable medium.

The computer readable medium can include permanent and non-permanent, removable and non-removable media that can implement information storage using various methods. The information may be computer readable instructions, data structures, modules of a program, or other data. Examples of the computer storage medium can include, but are not limited to, a phase change memory (PRAM), a static random access memory (SRAM), a dynamic random access memory (DRAM), other types of random access memory (RAM), a read only memory (ROM), an electrically erasable programmable read only memory (EEPROM), a flash memory or other memory technologies, a CD-ROM, a digital versatile disc (DVD) or other optical storage, a magnetic cassette, a magnetic tape or disc storage or other magnetic storage device, or any other non-transportable medium that can be used to store information accessible by a computing device. The computer readable medium may not include transitory computer readable media (transitory media), such as modulated data signals and carrier waves.

It is appreciated that the terms "include" or "comprise" or any other variations used herein may encompass a non-exclusive inclusion. A process, a method, an article, or a device that includes a series of elements can include not only those listed elements but also other elements that are not explicitly listed, or elements that are inherent to such a process, a method, an article, or a device. An element defined by the phrase "comprising a . . . ," without further limitation, does not exclude the presence of additional identical elements in the process, the method, the article, or the device including the element.

As noted above, embodiments of the specification can be implemented in the form of computer-executable instructions executed by a computer, such as program modules. Generally, the program modules can include routine, programs, objects, components, data structures, and the like that can be used to perform particular tasks or implement particular data types. Further, embodiments of the specification can also be practiced in distributed computing environments where tasks are performed by remote processing devices that are connected through a communication network. In a distributed computing environment, program modules can be located in both local and remote computer storage media.

Various embodiments of the specification are described above. Reference can be made to identical or similar parts described with respect to different embodiments. Further, description of one embodiment may focus on differences from some other embodiments. For example, for the system embodiments, as the procedures performed therein may be similar to the method embodiments, reference can be made to the detailed description provided with respect to the method embodiments.

The above description provides only some embodiments of the specification and is not intended to limit the specification. Various changes and modifications can be made to the embodiments by those skilled in the art, consistent with the specification. Any modifications, equivalent substitutions, improvements, etc. made consistent with the spirit of the specification shall all fall within the scope defined in the appended claims.

What is claimed is:

1. A service processing method, comprising:
   receiving radio frequency (RF) signals sent by at least one terminal device, the RF signals including at least one device identifier of the at least one terminal device;

selecting an RF signal from the received RF signals, and determining a terminal device corresponding to a device identifier included in the selected RF signal as a target payment device;

collecting first biometric feature information of a user using the terminal device;

obtaining a verification result of a verification on the user's identity based on the first biometric feature information; and sending a payment request to a server if the verification is passed, wherein the payment request is configured to request for completing payment based on a payment account corresponding to the target payment device, wherein selecting the RF signal from the received RF signals comprises at least one of:

determining, from the received RF signals, an RF signal having a signal strength greater than a preset value;

determining, from the received RF signals, an RF signal corresponding to a distance value smaller than a preset threshold; or selecting an RF signal from the received RF signals according to user information, and wherein obtaining the verification result of the verification on the user's identity based on the first biometric feature information comprises:

obtaining the verification result of the verification on the user's identity based on a mapping relationship between the device identifier included in the selected RF signal and second biometric feature information of a user corresponding to the device identifier, wherein the mapping relationship is stored on the server.

2. The service processing method of claim 1, wherein selecting the RF signal from the received RF signals further comprises:

determining a time at which each of the RF signals is received;

sorting each of the RF signals according to the time; and determining, according to a sorting result, an RF signal having a sorting number smaller than a preset number.

3. The service processing method of claim 1, wherein receiving the RF signals sent by the at least one terminal device comprises:

receiving the RF signals sent by the at least one terminal device when detecting that the at least one terminal device arrives at a detection region.

4. The service processing method of claim 3, wherein detecting that the at least one terminal device arrives at the detection region comprises:

transmitting a detection signal; and when a feedback signal sent by the terminal device is received, determining that the terminal device arrives at the detection region.

5. The service processing method of claim 1, wherein collecting the first biometric feature information of the user using the terminal device comprises:

collecting the first biometric feature information of the user using the terminal device through an image recognition device.

6. The service processing method of claim 1, wherein the first biometric feature information comprises one or more of face feature information, fingerprint information, palmprint information, eye print information, and iris information.

7. The service processing method of claim 1, further comprising:

acquiring, from the server, the second biometric feature information of the user corresponding to the device identifier;

comparing the first biometric feature information with the second biometric feature information; and obtaining the verification result of the verification on the user's identity according to a comparison result.

8. The service processing method of claim 1, wherein sending the payment request to the server comprises:

when the verification is passed, determining a payment amount according to order data included in the selected RF signal; and sending the payment request carrying the payment amount to the server.

9. The service processing method of claim 1, further comprising:

receiving first monitoring data sent by an Internet of Things monitoring device, wherein the first monitoring data includes the device identifier of the terminal device used by the user entering a target site; and storing the device identifier into a user list.

10. A service processing device, comprising:

a processor; and a memory storing instructions executable by the processor;

wherein the processor is configured to:

receive radio frequency (RF) signals sent by at least one terminal device, the RF signals including at least one device identifier of the at least one terminal device;

select an RF signal from the received RF signals, and determining a terminal device corresponding to a device identifier included in the selected RF signal as a target payment device;

collect first biometric feature information of a user using the terminal device;

obtain a verification result of a verification on the user's identity based on the first biometric feature information; and send a payment request to a server if the verification is passed, wherein the payment request is configured to request for completing payment based on a payment account corresponding to the target payment device, wherein in selecting the RF signal from the received RF signals, the processor is further configured to perform at least one of:

determining, from the received RF signals, an RF signal having a signal strength greater than a preset value;

determining, from the received RF signals, an RF signal corresponding to a distance value smaller than a preset threshold; or selecting an RF signal from the received RF signals according to user information, and wherein in obtaining the verification result of the verification on the user's identity based on the first biometric feature information, the processor is further configured to:

obtain the verification result of the verification on the user's identity based on a mapping relationship between the device identifier included in the selected RF signal and second biometric feature information of a user corresponding to the device identifier, wherein the mapping relationship is stored on the server.

11. The service processing device of claim 10, wherein in selecting the RF signal from the received RF signals, the processor is further configured to:

determine a time at which each of the RF signals is received;

sort each of the RF signals according to the time; and determine, according to a sorting result, an RF signal having a sorting number smaller than a preset number.

12. The service processing device of claim 10, wherein the processor is further configured to:
   receive the RF signals sent by the at least one terminal device when detecting that the at least one terminal device arrives at a detection region.

13. The service processing device of claim 12, wherein the processor is further configured to:
   transmit a detection signal; and
   when a feedback signal sent by the terminal device is received, determine that the terminal device arrives at the detection region.

14. The service processing device of claim 10, wherein the processor is further configured to:
   collect the first biometric feature information of the user using the terminal device through an image recognition device.

15. The service processing device of claim 10, wherein the first biometric feature information comprises one or more of face feature information, fingerprint information, palmprint information, eye print information, and iris information.

16. The service processing device of claim 10, wherein the processor is further configured to:
   acquire, from the server, the second biometric feature information of the user corresponding to the device identifier;
   compare the first biometric feature information with the second biometric feature information; and
   obtain the verification result of the verification on the user's identity according to a comparison result.

17. The service processing device of claim 10, wherein the processor is further configured to:
   when the verification is passed, determine a payment amount according to order data included in the selected RF signal; and
   send the payment request carrying the payment amount to the server.

18. A non-transitory computer readable medium storing instructions that, when executed by a processor of a device, cause the device to perform a service processing method, the method comprising:
   receiving radio frequency (RF) signals sent by at least one terminal device, the RF signals including at least one device identifier of the at least one terminal device;
   selecting an RF signal from the received RF signals, and determining a terminal device corresponding to a device identifier included in the selected RF signal as a target payment device;
   collecting first biometric feature information of a user using the terminal device;
   obtaining a verification result of a verification on the user's identity based on the first biometric feature information; and
   sending a payment request to a server if the verification is passed, wherein the payment request is configured to request for completing payment based on a payment account corresponding to the target payment device,
   wherein selecting the RF signal from the received RF signals comprises at least one of:
   determining, from the received RF signals, an RF signal having a signal strength greater than a preset value;
   determining, from the received RF signals, an RF signal corresponding to a distance value smaller than a preset threshold; or
   selecting an RF signal from the received RF signals according to user information, and
   wherein obtaining the verification result of the verification on the user's identity based on the first biometric feature information comprises:
   obtaining the verification result of the verification on the user's identity based on a mapping relationship between the device identifier included in the selected RF signal and second biometric feature information of a user corresponding to the device identifier, wherein the mapping relationship is stored on the server.

* * * * *